United States Patent
Xu

(10) Patent No.: US 12,414,502 B2
(45) Date of Patent: Sep. 16, 2025

(54) LAWN MOWER AND CUTTING BLADE

(71) Applicant: Nanjing Chervon Industry Co., Ltd., Nanjing (CN)

(72) Inventor: Haishen Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 822 days.

(21) Appl. No.: 17/535,054

(22) Filed: Nov. 24, 2021

(65) Prior Publication Data

US 2022/0183227 A1 Jun. 16, 2022

(30) Foreign Application Priority Data

Dec. 11, 2020 (CN) .......................... 202011441981.5
Dec. 11, 2020 (CN) .......................... 202011452928.5

(51) Int. Cl.
*A01D 34/73* (2006.01)
*A01D 34/69* (2006.01)
*A01D 101/00* (2006.01)

(52) U.S. Cl.
CPC ............. *A01D 34/73* (2013.01); *A01D 34/69* (2013.01); *A01D 2101/00* (2013.01)

(58) Field of Classification Search
CPC ................................ A01D 34/69; A01D 34/73
See application file for complete search history.

(56) References Cited

U.S. PATENT DOCUMENTS

| | | | |
|---|---|---|---|
| 3,910,017 A * | 10/1975 | Thorud | A01D 34/73 56/295 |
| 5,501,068 A * | 3/1996 | Martz | A01D 34/73 56/DIG. 17 |
| 6,470,662 B1 | 10/2002 | Burke et al. | |
| 2003/0221404 A1 | 12/2003 | Hancock et al. | |
| 2013/0327007 A1 | 12/2013 | Eavenson, Sr. et al. | |
| 2014/0182257 A1 | 7/2014 | Von Rentzell | |
| 2015/0082763 A1 * | 3/2015 | Nishihara | A01D 34/63 56/289 |
| 2018/0177124 A1 | 6/2018 | Kuriyagawa et al. | |
| 2020/0100426 A1 | 4/2020 | Kurihara et al. | |

FOREIGN PATENT DOCUMENTS

| | | |
|---|---|---|
| CN | 104335755 A | 2/2015 |
| EP | 2615903 B1 | 5/2017 |
| FR | 2248771 A1 | 5/1975 |
| FR | 2865610 A1 | 8/2005 |
| JP | H0646638 A | 2/1994 |
| WO | 2020/063609 A9 | 5/2017 |
| WO | 2020/063609 A1 | 4/2020 |

OTHER PUBLICATIONS

EPO, extended European search report issued on European patent application No. 21210918.5, dated May 16, 2022, 8 pages.

* cited by examiner

*Primary Examiner* — Joseph M Rocca
*Assistant Examiner* — Robert E Pezzuto
(74) *Attorney, Agent, or Firm* — Greenberg Traurig, LLP

(57) ABSTRACT

A cutting blade is capable of being driven to rotate around a first axis. The cutting blade includes cutting portions comprising cutting edges for cutting and extension portions closer to the first axis relative to the cutting portions. Each of the extension portions comprises an upper surface and a lower surface, at least part of the upper surface is a part of a side surface of a first cone with the first axis as an axis, and at least part of the lower surface is a part of a side surface of a second cone with the first axis as an axis.

19 Claims, 10 Drawing Sheets

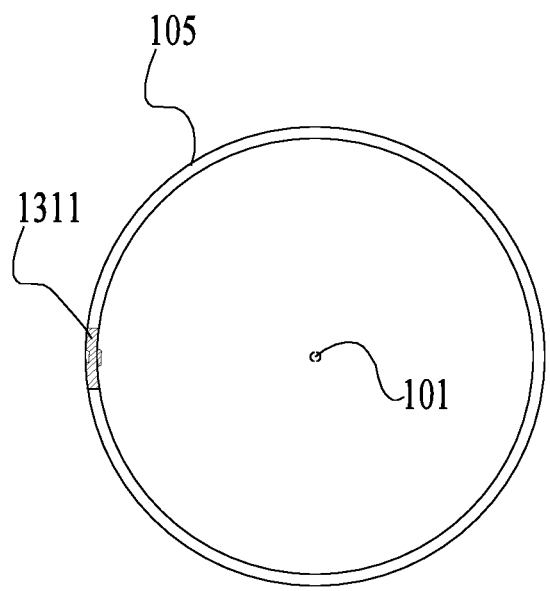
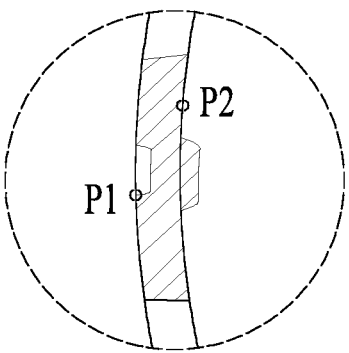
FIG. 6A  FIG. 6B
FIG. 7

LAWN MOWER AND CUTTING BLADE

RELATED APPLICATION INFORMATION

This application claims the benefit under 35 U.S.C. § 119(a) of Chinese Patent Application No. CN 202011441981.5, filed on Dec. 11, 2020, and Chinese Patent Application No. CN 202011452928.5, filed on Dec. 11, 2020, which are incorporated herein by reference in their entirety.

TECHNICAL FIELD

The present disclosure relates to a power tool and, in particular, to a lawn mower and a cutting blade.

BACKGROUND

A lawn mower cuts vegetation through a cutting blade. An ineffective load of the blade is an important factor affecting the time of endurance and mowing performance of the lawn mower. However, due to the design requirements for the strength of the blade, it is often difficult to reduce the ineffective load of the blade, which is not conducive to the optimization of the overall performance of the lawn mower.

SUMMARY

In one example, a cutting blade is capable of being mounted to a lawn mower. When the cutting blade is mounted to the lawn mower, the cutting blade is capable of being driven to rotate around a first axis. The cutting blade includes cutting portions including cutting edges for cutting and extension portions closer to the first axis relative to the cutting portions. Each of the extension portions includes a main body, and the main body constitutes a main part of each of the extension portions. Each of the extension portions is configured to have at least three planes passing through the first axis, and cross-sections of the main body on the at least three planes are substantially the same.

In one example, the main body includes a first section and a second section disposed on two sides of a centerline of the main body, and a vertical distance between each point, on an inner edge of a cross-section perpendicular to the first axis, of at least part of the first section and the first axis is the same.

In one example, the main body includes an upper surface and a lower surface, and the upper surface is a part of the side surface of a first cone with the first axis as an axis.

In one example, the lower surface is a part of the side surface of a second cone with the first axis as an axis.

In one example, the main body includes a centerline, and a distance between the upper surface and the lower surface is the same along any direction parallel to the centerline.

In one example, the main body includes a first cross-section in a plane perpendicular to the first axis, and the inner and outer edges of the first cross-section are parallel arcs.

In one example, the main body includes a first cross-section in a plane perpendicular to the first axis, the main body has an equivalent load region corresponding to the cross-section when the cutting blade is driven to rotate, and a ratio of an area of the first cross-section to an area of the equivalent load region is configured to be greater than or equal to 75%.

In one example, the first cross-section substantially coincides with the equivalent load region.

In one example, the main body includes a light-loaded section, a ratio of an area of any cross-section of the light-loaded section in a plane perpendicular to the first axis to an area of an equivalent load region of the any cross-section is configured to be greater than or equal to 75%, and a ratio of a length of the main body in a direction of a centerline of the main body to a length of the light-loaded section in the direction of the centerline of the main body is greater than or equal to 1 and less than or equal to 3.

In one example, any cross-section of the light-loaded section in a plane perpendicular to the first axis coincides with an equivalent load region corresponding to the any cross-section.

In one example, a cutting blade is capable of being driven to rotate around a first axis. The cutting blade includes cutting portions including cutting edges for cutting and extension portions closer to the first axis relative to the cutting portions. Each of the extension portions includes an upper surface and a lower surface, at least part of the upper surface is a part of the side surface of a first cone with the first axis as an axis, or at least part of the lower surface is a part of the side surface of a second cone with the first axis as an axis.

In one example, each of the extension portions includes a main body, the main body constitutes a main part of the each of the extension portions and includes a first section and a second section disposed on two sides of a centerline of the main body, and a vertical distance between each point, on an inner edge of a cross-section perpendicular to the first axis, of at least part of the first section and the first axis is the same.

In one example, a vertical distance between each point, on an edge of a cross-section perpendicular to the first axis, of at least part of the second section and the first axis is the same.

In one example, the upper surface is a part of the side surface of the first cone with the first axis as the axis.

In one example, the lower surface is a part of the side surface of the second cone with the first axis as the axis.

In one example, each of the extension portions includes a main body and a rib, the main body constitutes a main part of the each of the extension portions, and the rib is disposed on the main body.

In one example, the main body includes a centerline, and a distance between the upper surface and the lower surface is the same along any direction parallel to the centerline.

In one example, the main body includes a first cross-section in a plane perpendicular to the first axis, and the inner and outer edges of the first cross-section are parallel arcs.

In one example, at least part of the upper surface is a part of the side surface of the first cone with the first axis as an axis, and at least part of the lower surface is a part of the side surface of the second cone with the first axis as an axis.

In one example, a lawn mower includes a cutting blade, a base connected to the cutting blade, a motor configured to drive the cutting blade to rotate around a first axis and driving wheels configured to drive the base to move. The cutting blade includes cutting portions for cutting and extension portions closer to the first axis relative to the cutting portions, each of the extension portions includes an upper surface and a lower surface, at least part of the upper surface is a part of the side surface of a first cone with the first axis as an axis, or at least part of the lower surface is a part of the side surface of a second cone with the first axis as an axis.

BRIEF DESCRIPTION OF DRAWINGS

FIG. 6A is an equivalent load ring of the main body corresponding to a first section;

FIG. 6B is an enlarged view of a partial area of FIG. 6A;

FIG. 7 is a schematic view of a cross-section of the extension portion in FIG. 5 of the present disclosure and an equivalent load region of the cross-section;

DETAILED DESCRIPTION

Figure 1:
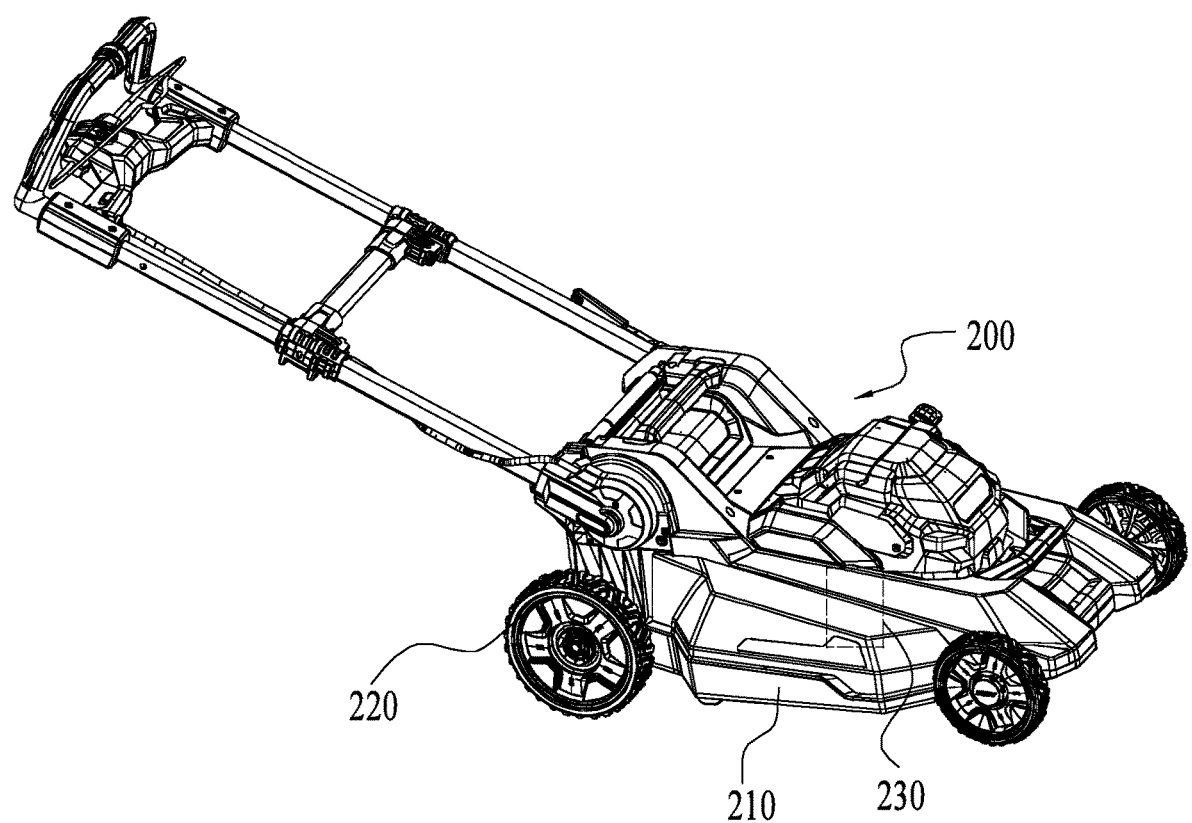
FIG. 1 is a structural view of a lawn mower according to an example of the present disclosure.

Examples in accordance with the present disclosure are described in detail hereinafter. Examples are illustrated in the drawings, where the same or similar reference numerals indicate the same or similar elements or elements having the same or similar functions. The examples are intended to explain the present disclosure and are not to be construed as limiting the present disclosure.

Technical solutions of the present disclosure are further described hereinafter in conjunction with drawings and examples.

Figure 2:
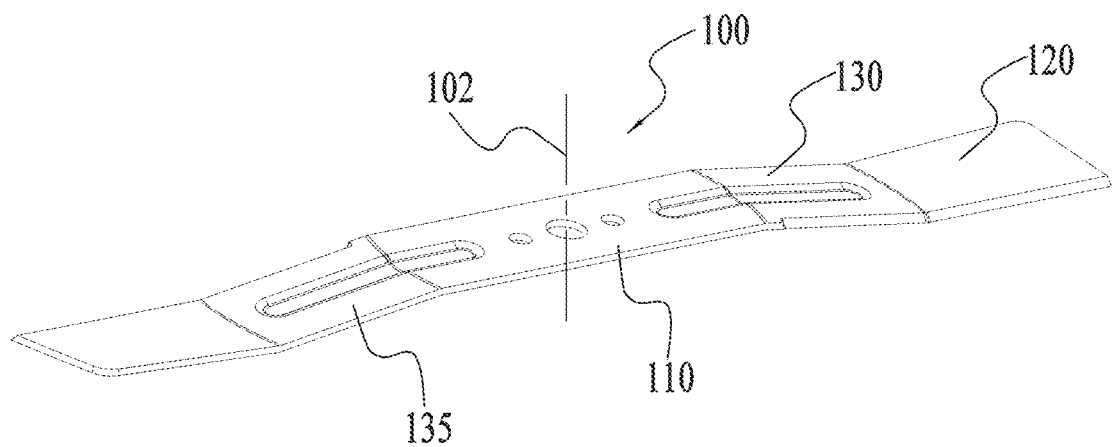
FIG. 2 is a perspective view of a cutting blade according to an example of the present disclosure.

Referring to FIGS. 1 and 2, the present disclosure provides a cutting blade 100 and a lawn mower 200 using the cutting blade 100. When the cutting blade 100 is mounted to the lawn mower 200, the cutting blade 100 can be driven by the lawn mower 200 to rotate around a first axis 102. The lawn mower 200 implements a mowing operation through the cutting blade 100. The lawn mower 200 includes a base 210, a motor 230, a power supply, and driving wheels 220. The cutting blade 100 is connected to the base 210. The motor 230 is disposed in the base 210. The blade and the base 210 are connected through the motor 230. The motor 230 is configured to drive the cutting blade 100 to rotate. The cutting blade 100 is generally disposed in a chassis below the base 210 and cuts vegetation by rotating. The power supply is connected to the base 210 and configured to supply power to the motor 230. The driving wheels 220 are connected to the base 210 to achieve the movement of the lawn mower 200. Optionally, a user may supply power to drive the driving wheels 220 to move, or the motor 230 may be provided to supply power to the driving wheels 220 so that the driving wheels 220 is self-propelled.

Figure 3:
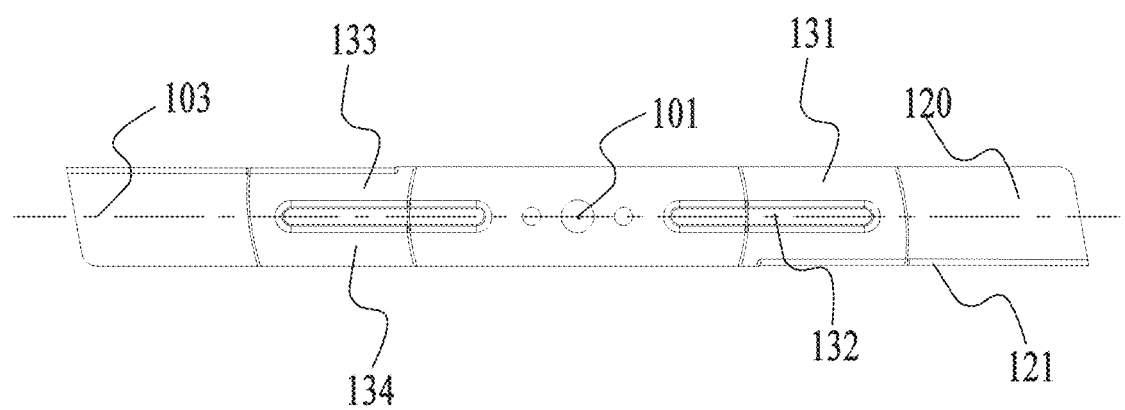
FIG. 3 is a plan view of the cutting blade in FIG. 2 of the present disclosure.
Figure 4:
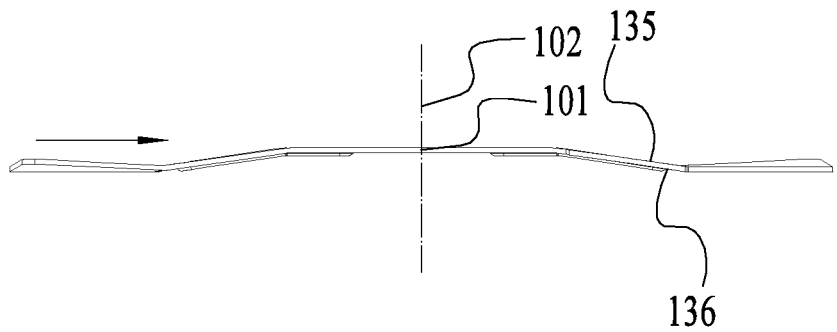
FIG. 4 is a plan view of the cutting blade in FIG. 2 of the present disclosure from another angle.

Referring to FIGS. 3 and 4, the cutting blade 100 includes a central portion 110, cutting portions 120, and extension portions 130, where the central portion 110 is configured to be connected to the motor 230 of the lawn mower 200. The lawn mower 200 includes an output shaft connected to the motor 230, and the cutting blade 100 is detachably connected to the output shaft. The output shaft extends from an inside of the base 210 to a lower side of the base 210 to drive the cutting blade 100 to rotate. The central portion 110 is connected to the output shaft, and a cutting blade is driven to rotate through the output shaft when the motor 230 is operating. A rotation center 101 of the cutting blade 100 is disposed on the central portion 110, and the cutting blade 100 can rotate around the first axis 102 passing through the rotation center 101. The output shaft is connected to the cutting blade 100 at the rotation center 101 of the cutting blade 100, and the motor 230 and the output shaft extend along the first axis 102 to drive the cutting blade 100 to rotate around the first axis 102. Optionally, the cutting blade 100 is symmetrical about the rotation center 101, and the cutting portions 120 are disposed on two sides of the rotation center 101. The extension portion 130 includes a main body 131 and a rib 132. The extension portion 130 includes a centerline 103 passing through a center of a main body 131. Optionally, the main body 131 is basically symmetrical about the centerline 103. The centerline 103 is located substantially in a middle of the main body 131. Referring to FIG. 3, a projection of the extension portion 130 along an axial direction of the first axis 102 extends along the centerline 103.

Optionally, the centerline 103 is perpendicular to the first axis 102. In this manner, an extending direction of the cutting portion 120 is a radial direction of the first axis 102. The cutting portions 120 include cutting edges 121 for cutting. The extension portion 130 is connected to the cutting portion 120 and the central portion 110. The extension portions 130 are disposed on two sides of the rotation center 101. The extension portions are closer to the first axis 102 relative to the cutting portions 120 and extend along the centerline 103 to two sides of the rotation center 101. The extension portion 130 is disposed between the central portion 110 and the cutting portion 120. Along the centerline 103 in a direction farther from the rotation center 101, the extension portions 130 extend downward so that in the axial direction of the first axis 102, a height of the cutting portion 120 is lower than a height of the central portion 110. In this manner, the cutting portions 120 can cut vegetation at low places and the collision of obstacles such as the ground on the central portion 110 can be reduced.

The rib 132 is disposed on the main body 131 and configured to strengthen the strength of the main body 131. The main body 131 constitutes a main part of the extension portion 130. The main body 131 referred to in the present disclosure should be regarded as a structure where the rib 132 is removed. For example, a convex part of the rib 132 is removed, and a recess generated by the rib 132 is filled so that a surface of the main body is smooth. An additional structure such as a convex on a surface of the extension portion 130 is not a part of the main body 131.

Optionally, the cutting edge is disposed at a side end of the extension portion and configured to cut vegetation.

When the lawn mower 200 is in a mowing operation, an operation load of the cutting blade 100 is mainly composed of a cutting load generated by cutting vegetation and a blade load generated by the blade when the blade rotates. Therefore, reducing the blade load can effectively improve the endurance of the lawn mower 200 and improve the actual cutting load capacity of the blade. When the cutting blade 100 is driven to rotate, the main body 131 has an equivalent load region 1312 on any first cross-section 1311 in a plane perpendicular to of the first axis 102. A ratio of an area of the first cross-section 1311 to an area of the equivalent load region 1312 of the first cross-section 1311 is configured to be greater than or equal to 75%. Optionally, the ratio of the area of the first cross-section 1311 to the area of the equivalent load region 1312 of the first cross-section 1311 is configured to be greater than or equal to 85%. Here, referring to FIGS. 5 to 7, the first cross-section 1311 of the main body 131 refers to a figure in which the cross-section of the extension portion 130 in the plane removes the cross-section of the rib 132 and fills the recess corresponding to the rib 132. A point of the first cross-section 1311 that is farthest from the rotation center 101 is a farthest point P1, and a circle centered on a point on the rotation center 101 and passing through the farthest point P1 is the first equivalent load circle. A point of the first cross section 1311 that is nearest from the rotation center 101 is the nearest point P2, and a circle centered on the point on the rotation center 101 and passing through the nearest point P2 is the second equivalent load circle. A ring between the first equivalent load circle and the second equivalent load circle is an equivalent load ring 105. A section on the equivalent load ring 105 passing through the outermost edge of the first cross-section 1311 is the equivalent load region 1312 of the first cross-section 1311. The area of the equivalent load region 1312 of the first cross-section 1311 affects the load of the first-section 1311 of the cutting blade 100 when the cutting blade 100 is operating, that is, the larger the area of the equivalent load region 1312 is, the larger the blade load generated when the cutting blade 100 rotates is. To ensure the strength of the cutting blade 100, a dimension of the cutting blade 100 cannot be too small. Therefore, a difference between the area of the first cross-section 1311 of the cutting blade 100 and the area of the equivalent load region 1312 corresponding to the first cross-section 1311 is reduced so that while the strength of the cutting blade 100 is ensured, the area of the equivalent load region 1312 is reduced, the blade load when the cutting blade 100 rotates is reduced, and the torque generated when the blade rotates is effectively reduced. Here, the blade load may be understood as a load generated by driving the cutting blade 100 when the lawn mower 200 is unloaded.

Figure 5:
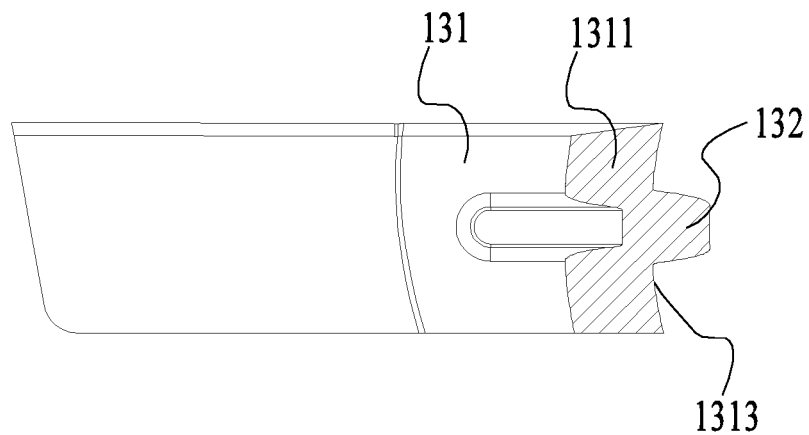
FIG. 5 is a sectional view of an extension portion of the cutting blade in FIG. 2 of the present disclosure.
Figure 8A:
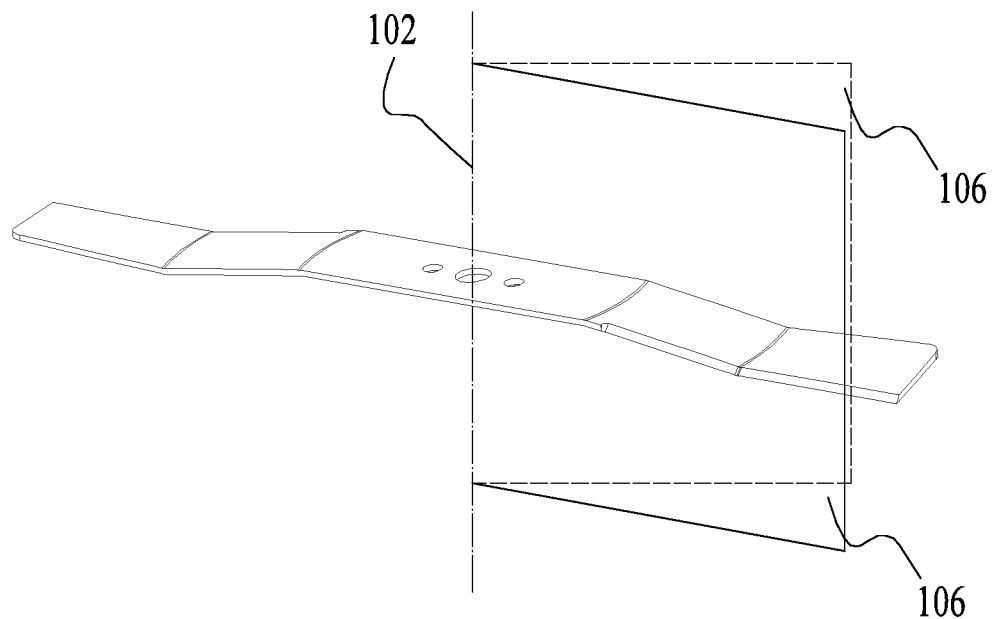
FIGS. 8A and 8B are schematic views of planes passing through a first axis according to an example of the present disclosure.
Figure 8B:
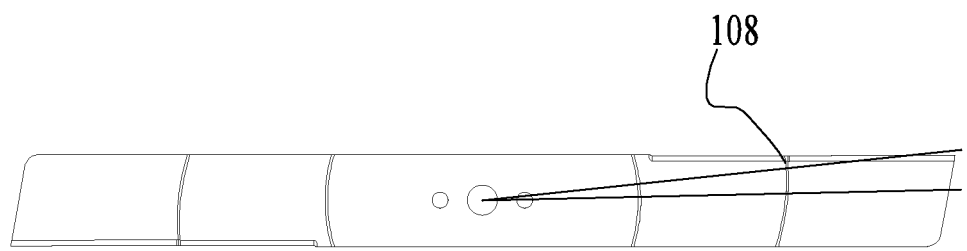
Figure 8C:
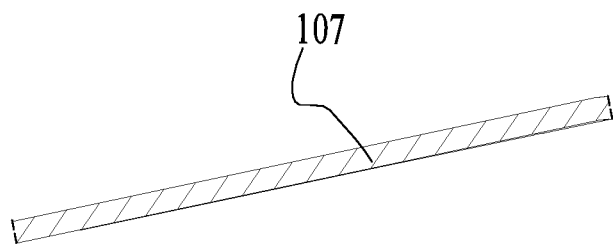
FIG. 8C is a sectional view of an extension portion in the plane in FIG. 8A of the present disclosure.

Referring to FIG. 5, in a direction along a radial direction of the centerline 103 and farther from the centerline 103, the extension portion 130 has a downward trend (in the figure, a direction perpendicular to a plane where the figure is located and extending to a rear of the plane is a downward direction). In practice, the downward direction refers to a position of the driving wheel relative to the base, and a cutting portion is located relatively below the central portion. Referring to FIGS. 8A, 8B, and 8C, at least three planes 106 passing through the first axis 102 exist, and cross-sections of the main body 131 on the planes 106 are basically the same. Here, the cross-sections are the same, which means that shapes and dimensions of the cross-sections are the same; the cross-sections are basically the same, which means that extending shapes of the cross-sections are basically the same, and a difference between areas of the cross-sections is less than 10% of the area. The difference between the cross-sections caused by the deformation of the rib or the surface of the blade belongs to the case where the cross-sections are basically the same. For a conventional cutting blade, the case where the cross-sections crossed by two planes with a small included angle are basically the same does not belong to the "basically the same" as provided in the present disclosure. Optionally, at least three planes 106 passing through the first axis 102 exist, an angle between two of the at least three planes 106 is greater than or equal to 2 degrees, the cross-sections of the main body 131 on the planes 106 are basically the same, and the cross-sections are defined as second cross-sections 107. In this manner, a difference between the area of the first cross-section 1311 of the cutting blade 100 and the area of the equivalent load region 1312 corresponding to the first cross-section 1311 can be effectively reduced. Here, the planes 106 pass through the first axis 102, which means that the first axis 102 is located in the planes 106 and is a line of intersection of the three planes 106. The main body 131 provided in the present disclosure should be understood as the main part of the extension portion 130. The deformation of the surface of the extension portion 130, or the addition or deletion of other structures should not be regarded as the main body of the extension portion provided in the present disclosure.

Optionally, it is defined that the extension portion 130 and the cutting portion 120 have a connecting line 108, the extension portion 130 and the cutting portion 120 are connected at the connecting line 108, and a cross-section of the main body on any plane passing through the first axis 102 and cutting the connecting line 108 is the same.

Figure 9A:
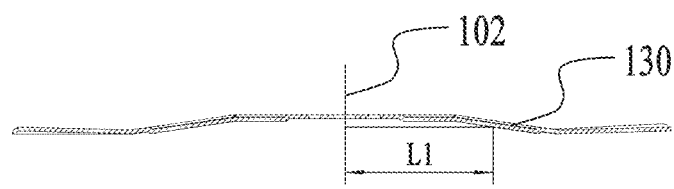
FIGS. 9A and 9B are schematic views illustrating a vertical distance between a point on an edge of a cross-section of the extension portion in FIG. 5 and a first axis according to the present disclosure.
Figure 9B:
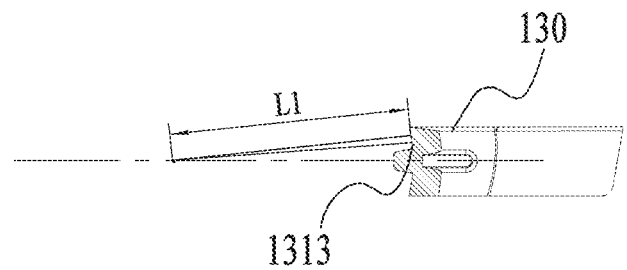

Referring to FIGS. 3, 9A and 9B, the main body 131 includes a first section 133 and a second section 134 disposed on two sides of the rib 132. Optionally, the rib 132 passes through the centerline 103, and the first section 133 and the second section 134 are symmetrical about the centerline 103. A vertical distance L1 between each point, on an inner edge 1313 of the first cross-section 1311 perpendicular to the first axis 102, of at least part of the first section 133 and the first axis 102 is the same. A vertical distance L1 between each point, on an edge of the first cross-section 1311 perpendicular to the first axis 102, of at least part of the second section 134 and the first axis 102 is the same. Here, the inner edge 1313 of the first cross-section 1311 refers to an edge line of the first section 133 closer to the rotation center 101, and the first cross-section 1311 should further include an outer edge line farther from the rotation center 101, where a vertical distance between each point on the outer edge line and the first axis 102 is also equal. The vertical distance between each point on the inner edge 1313 of the first cross-section 1311 and the first axis 102 refers to a length of a vertical line of each point on the inner edge 1313 of the first cross-section 1311 to the first axis. The structure of the main body 131 is adapted to the rotational movement of the cutting blade so that the edge of the first cross-section 1311 of the main body 131 is consistent with an overall circular trajectory of the first cross-section 1311 when the lawn mower 200 rotates. In this manner, the space of the equivalent load region 1312 corresponding to the first cross-section 1311 is fully used so that while the overall strength of the cutting blade 100 is not reduced, the blade load of the cutting blade 100 is reduced.

In the case where the vertical distance between each point, on the edge of the first cross-section 1311 perpendicular to the first axis 102, of at least part of the first section 133 and the first axis 102 is the same, a cutting surface formed by the first cross-section 1311, perpendicular to the first axis 102, of at least part of the first section 133 when the cutting blade 100 rotates around the first axis 102 is a surface of revolution with the first axis 102 as a rotation axis so that the cutting surface formed by the first cross-section 1311, perpendicular to the first axis 102, of the first section 133 when the cutting blade 100 rotates around the first axis 102 is a ring surface.

Figure 10:
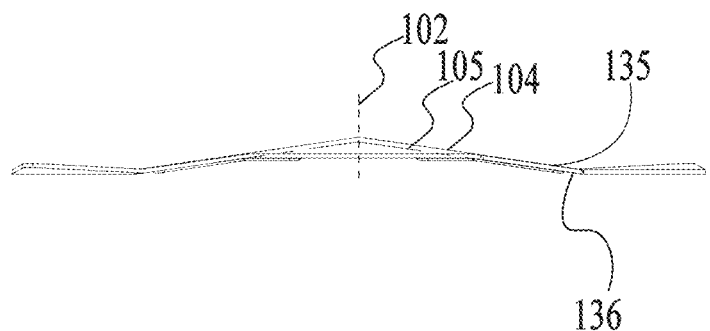
FIG. 10 is a schematic view of a first cone and a second cone in the cutting blade in FIG. 2 of the present disclosure.

Referring to FIG. 10, the main body 131 includes an upper surface 135 and a lower surface 136. The upper surface 135 is a part of the side surface of a first cone 104 with the first axis 102 as an axis, and the lower surface 136 is a part of the side surface of a second cone 105 with the first axis 102 as an axis. Therefore, edges of the first cross-section 1311 of the first section 133 in the radial direction of the first axis 102 should be a line segment on the upper surface 135 and a line segment on the lower surface 136, respectively. The edge of the first cross-section 1311 is an arc on a circle with a certain point on the first axis 102 as a center. Similarly, edges of the first cross-section 1311 of the second section 134 in the radial direction of the first axis 102 should be a line segment on the upper surface 135 and a line segment on the lower surface 136, respectively. The edge of the first cross-section 1311 is an arc on a circle with a certain point on the first axis 102 as a center. Optionally, along any direction parallel to the centerline 103, a distance between the upper surface 135 and the lower surface 136 is the same, and the inner and outer edges (1311c, 1311d) of the first cross-section 1311 are parallel arcs, which improves the balance of the cutting blade.

Optionally, the main body 131 is configured to have at least one first cross-section 1311 in the radial direction of the first axis 102, and the first cross-section 1311 coincides with the equivalent load region 1312 so that the blade load of the cutting blade 100 can be reduced. Optionally, the main body 131 is configured to have at least one region; in this region, any first cross-section 1311 in the radial direction of the first axis 102 coincides with the corresponding equivalent load region 1312, thereby improving the performance of the lawn mower 200. Optionally, the cutting blade 100 is configured such that any first cross-section 1311 of the extension portion 130 of the cutting blade 100 in the radial direction of the first axis 102 coincides with the corresponding equivalent load region 1312.

Figure 11:
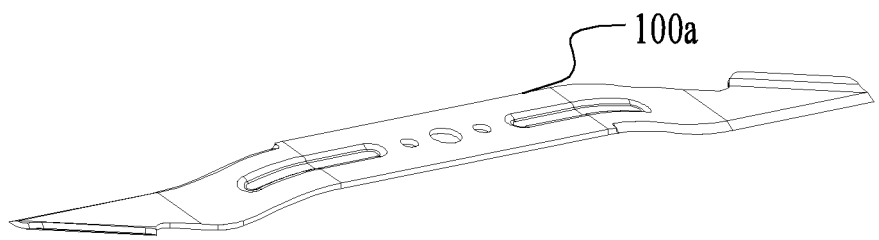
FIG. 11 is a structural view of an existing second cutting blade.
Figure 12:
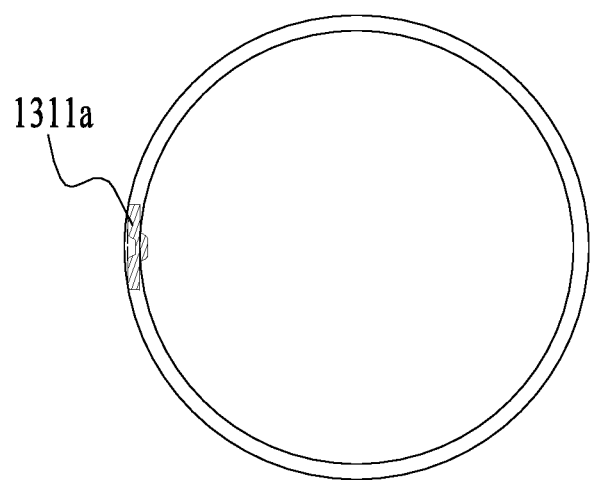
FIG. 12 is a sectional circular view of a cross-section of a second extension portion of the second cutting blade in FIG. 11 of the present disclosure.
Figure 13:
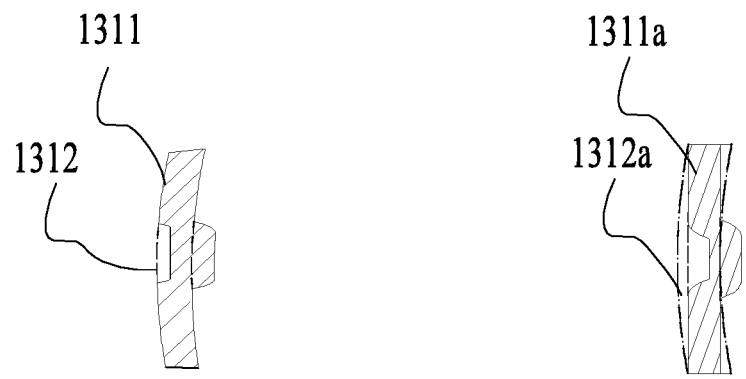
FIG. 13 is a comparison view of equivalent load regions of a first cutting blade and a second cutting blade.
Figure 14:
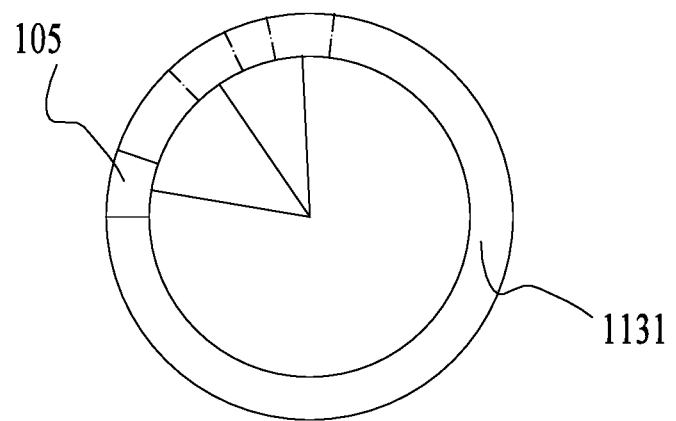
FIG. 14 is a schematic view of an equivalent load ring when a cross-section of the cutting blade in FIG. 5 rotates.
Figure 15:
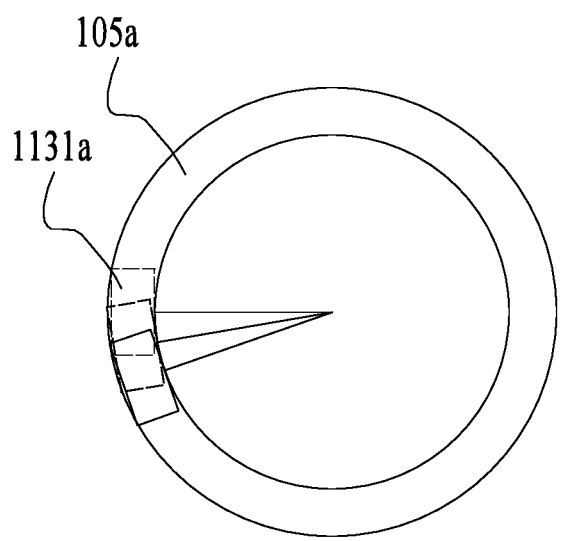
FIG. 15 is a schematic view of an equivalent load ring when a cross-section of a second cutting blade rotates.

Referring to FIG. 11, the principle of reducing the blade load of the cutting blade 100 provided in the present disclosure will now be introduced in conjunction with a structure of the existing cutting blade 100. To distinguish between cutting blades, the cutting blade 100 provided in the present disclosure is a first cutting blade, and the existing cutting blade is a second cutting blade 100a. Referring to FIGS. 12 and 13, in a second extension portion of the second cutting blade 100a, in the radial direction of the first axis, a first cross-section 1311a of the second extension portion is generally rectangular or irregular (not considering a structure of a rib). For example, the first cross-section 1311a is a rectangle. An equivalent load region 1312a corresponding to the first cross-section 1311a is an arc passing through four points on an outermost edge of the first cross-section 1311a, that is, in the second cutting blade 100a, an area of the first cross-section 1311a is less than an area of the corresponding equivalent load region 1312a. In this case, since the blade is generally designed symmetrically about the centerline, cross-sections of the main body on at most two planes, passing through the first axis, of the blade are the same. Referring to FIGS. 14 and 15, an area of an equivalent load ring 105a when the second cutting blade is operating is greater than an area of the equivalent load ring 105 when the first cutting blade is operating. Therefore, a blade load of the second cutting blade 100a in operation is greater than the blade load of the first cutting blade in operation. According to experimental tests, the first cutting blade provided in the present disclosure can reduce the blade load by 5% to 20% compared to the traditional second cutting blade, thereby improving the time of endurance of the lawn mower and improving the mowing performance of the lawn mower.

Figure 16:
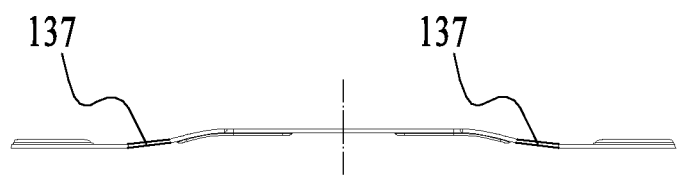
FIG. 16 is a structural view of a light-loaded section of a cutting blade according to an example of the present disclosure.

The main body 131 extends along the centerline 103 to two sides of the rotation center 101. Referring to FIG. 16, the main body 131 includes a light-loaded section 137. A ratio of an area of any first cross-section 1311 of the light-loaded section 137 in the radial direction of the first axis 102 to an area of the equivalent load region 1312 of the first cross-section 1311 is configured to be greater than or equal to 75%. Optionally, the ratio of the area of the first cross-section 1311 to the area of the equivalent load region 1312 of the first cross-section 1311 is configured to be greater than or equal to 85%. A ratio of a length of the main body 131 in a direction of the centerline 103 to a length of the light-loaded section 137 in the direction of the centerline 103 is greater than or equal to 1 and less than or equal to 3, so as to improve the endurance of the lawn mower 200 and improve the cutting performance of the lawn mower 200.

Optionally, any first cross-section 1311 of the light-loaded section 137 in the radial direction of the first axis 102 coincides with the equivalent load region 1312 corresponding to the first cross-section 1311.

Optionally, in the case where the cutting blade 100 is driven to rotate, the cutting portion 120 has the equivalent load region 1312 on any first cross-section 1311 in the radial direction of the first axis 102, the cutting portion 120 is configured to have at least one cross-section in the radial direction of the first axis 102, and a ratio of an area of the cross-section to an area of the equivalent load region of the section is configured to be greater than or equal to 75%.

Optionally, the light-loaded section is configured to be a section on the cutting blade, which may be a section in an extending direction of the centerline; along the extending direction of the centerline, the extension portion has a part that is not the light-loaded section. Optionally, the light-loaded section is configured to be a section on the cutting blade, which may be a section in the radial direction of the centerline; in the radial direction of the centerline, the extension portion has the light-loaded section and a non-light-loaded section. Therefore, at least part of the upper surface of the main body is a part of the side surface of a first cone with the first axis as the axis, and at least part of the lower surface of the main body is a part of the side surface of a second cone with the first axis as the axis.

Figure 17:
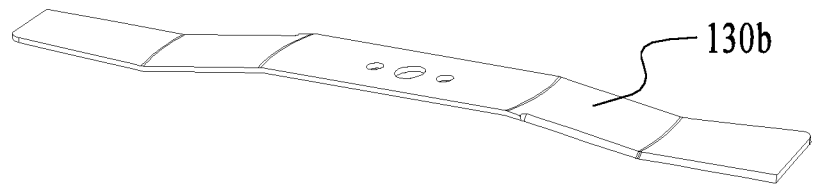
FIG. 17 is a structural view of a cutting blade according to an example of the present disclosure.
Figure 18:
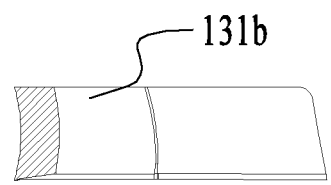
FIG. 18 is a sectional view of the cutting blade in FIG. 17.

Optionally, referring to FIGS. 17 and 18, an extension portion 130b only includes a main body 131b without a rib, and the structure of the main body 131b is also adapted to the description in the preceding examples.

Optionally, the extension portion further includes a rib, and cross-sections of the rib on at least three planes passing through the first axis are the same, that is, the structure of the rib is made similar to the structure of the main body, so as to reduce the blade load generated by the rib when the blade rotates.

The preceding examples illustrate only the basic principles and features of the present disclosure. The present disclosure is not limited by the preceding examples. Various modifications and variations made without departing from the spirit and scope of the present disclosure fall within the scope of the present disclosure. The scope of the present disclosure is defined by the appended claims and their equivalent.

What is claimed is:

1. A cutting blade capable of being mounted to a lawn mower, and when the cutting blade is mounted to the lawn mower, the cutting blade is capable of being driven to rotate around a first axis, the cutting blade comprising:
 a central portion connectable to the lawn mower about the first axis;
 cutting portions comprising cutting edges for cutting; and
 extension portions, coupling the central portion to the cutting portions, wherein the extension portions are closer to the first axis relative to the cutting portions, each of the extension portions comprises a main body, the main bodies constitute a main part of each of the extension portions, each of the extension portions is configured to have at least three planes passing through the first axis, and cross-sections of the main bodies on the at least three planes are substantially the same, and
 wherein transition lines formed between the central portion and the extension portions are an arcuate line extending an entire width of the cutting blade.

2. The cutting blade of claim 1, wherein each of the main bodies comprises a first section and a second section disposed on two sides of a centerline of each of the main bodies and a vertical distance between each point, on an inner edge of a cross-section perpendicular to the first axis, of at least part of the first section and the first axis is the same.

3. The cutting blade of claim 1, wherein each of the main bodies comprises an upper surface and a lower surface and the upper surface is a part of a side surface of a first cone with the first axis as an axis.

4. The cutting blade of claim 3, wherein the lower surface is a part of a side surface of a second cone with the first axis as an axis.

5. The cutting blade of claim 4, wherein each of the main bodies comprises a centerline and a distance between the upper surface and the lower surface is the same along any direction parallel to the centerline.

6. The cutting blade of claim 2, wherein each of the main bodies comprises a first cross-section in a plane perpendicular to the first axis and the inner and outer edges of the first cross-section are parallel arcs.

7. The cutting blade of claim 1, wherein each of the main bodies comprises a first cross-section in a plane perpendicular to the first axis, each of the main bodies has an equivalent load region corresponding to the cross-section when the cutting blade is driven to rotate, and a ratio of an area of the first cross-section to an area of the equivalent load region is configured to be greater than or equal to 75%.

8. The cutting blade of claim 7, wherein the first cross-section substantially coincides with the equivalent load region.

9. The cutting blade of claim 1, wherein each of the main bodies comprises a light-loaded section, a ratio of an area of any cross-section of the light-loaded section in a plane perpendicular to the first axis to an area of an equivalent load region of the any cross-section is configured to be greater than or equal to 75%, and a ratio of a length of the each of the main bodies in a direction of a centerline of each of the main bodies to a length of the light-loaded section in the direction of the centerline of each of the main bodies is greater than or equal to 1 and less than or equal to 3.

10. A cutting blade capable of being driven to rotate around a first axis, comprising:
 a central portion rotatable about the first axis;
 cutting portions comprising cutting edges for cutting; and
 extension portions, coupling the central portion to the cutting portions, wherein the extension portions are closer to the first axis relative to the cutting portions, each of the extension portions comprises an upper surface and a lower surface, and at least part of the upper surface is a part of a side surface of a first cone with the first axis as an axis of the first cone or at least part of the lower surface is a part of a side surface of a second cone with the first axis as an axis of the first cone, and
 wherein first transition lines formed between the central portion and the extension portions are an arcuate line extending an entire width of the cutting blade and second transition lines formed between the extension portions and the cutting portions is also an arcuate line extending the entire width of the cutting blade.

11. The cutting blade of claim 10, wherein each of the extension portions comprises a main body, each of the main bodies constitutes a main part of the each of the extension portions and comprises a first section and a second section disposed on two sides of a centerline of each of the main bodies, and a vertical distance between each point, on an inner edge of a cross-section perpendicular to the first axis, of at least part of the first section and the first axis is the same.

12. The cutting blade of claim 11, wherein a vertical distance between each point, on an edge of a cross-section perpendicular to the first axis, of at least part of the second section and the first axis is the same.

13. The cutting blade of claim 10, wherein the upper surface is the part of the side surface of the first cone with the first axis as the axis of the first cone.

14. The cutting blade of claim 10, wherein the lower surface is the part of the side surface of the second cone with the first axis as the axis of the first cone.

15. The cutting blade of claim 10, wherein each of the extension portions further comprises a rib, and the rib is disposed on each of the main bodies.

16. The cutting blade of claim 15, wherein each of the main bodies comprises a centerline and a distance between the upper surface and the lower surface is the same along any direction parallel to the centerline.

17. The cutting blade of claim 15, wherein each of the main bodies comprises a first cross-section in a plane perpendicular to the first axis and the inner and outer edges of the first cross-section are parallel arcs.

18. The cutting blade of claim 10, wherein the at least the part of the upper surface is the part of the side surface of the first cone with the first axis as an axis of the first cone and the at least part of the lower surface is the part of the side surface of the second cone with the first axis as an axis of the first cone.

19. A lawn mower, comprising:
 a cutting blade;
 a base connected to the cutting blade;
 a motor configured to drive the cutting blade to rotate around a first axis; and
 driving wheels configured to drive the base to move;
 wherein the cutting blade comprises cutting portions for cutting and extension portions closer to the first axis relative to the cutting portions, each of the extension portions comprises an upper surface and a lower surface, and at least part of the upper surface is a part of a side surface of a first cone with the first axis as an axis of the first cone or at least part of the lower surface is a part of a side surface of a second cone with the first axis as an axis of the first cone, when the cutting blade is mounted to the lawn mower, the cutting blade is driven to rotate around a first axis, the cutting blade comprising:

a central portion configured to be connected to the lawn mower;

cutting portions comprising cutting edges for cutting; and extension portions, wherein the extension portions are closer to the first axis relative to the cutting portions, the extension portions are between the central portion and the cutting portions, a transition line is formed between the central portion and one of the extension portions, and the transition line is arcuate across an entirety of a width of the cutting blade.

* * * * *